United States Patent
Akatani et al.

(10) Patent No.: US 6,779,190 B2
(45) Date of Patent: Aug. 17, 2004

(54) DISK CARRIER DEVICE OF DISK PLAYER

(75) Inventors: Shigeru Akatani, Tokyo (JP); Takashi Yamanaka, Tokyo (JP)

(73) Assignee: Tanashin Denki Co., Ltd., Tokyo (JP)

( * ) Notice: Subject to any disclaimer, the term of this patent is extended or adjusted under 35 U.S.C. 154(b) by 280 days.

(21) Appl. No.: 10/105,221

(22) Filed: Mar. 26, 2002

(65) Prior Publication Data

US 2003/0043721 A1 Mar. 6, 2003

(30) Foreign Application Priority Data

Sep. 4, 2001 (JP) .......................................... 2001-266589

(51) Int. Cl.[7] .................................................. G11B 17/04
(52) U.S. Cl. ........................................................ 720/624
(58) Field of Search .......................... 369/75.1, 75.2, 369/77.1, 77.2; 360/99.02, 99.03, 99.06, 99.07; 720/624, 625, 642

(56) References Cited

U.S. PATENT DOCUMENTS

| | | | | |
|---|---|---|---|---|
| 5,036,509 A | * | 7/1991 | Kobayashi et al. ........ | 369/75.2 |
| 5,467,334 A | * | 11/1995 | Kim ........................... | 369/77.1 |
| 5,719,844 A | * | 2/1998 | Abe ........................... | 369/77.1 |
| 6,594,218 B2 | * | 7/2003 | Kikuchi et al. ............ | 369/77.1 |
| 6,636,470 B1 | * | 10/2003 | Sasada et al. .............. | 369/77.1 |

FOREIGN PATENT DOCUMENTS

| | | | |
|---|---|---|---|
| JP | 4-71267 | | 12/1983 |
| JP | 7-161107 | * | 6/1995 |
| JP | 9-102158 | * | 4/1997 |
| JP | 10-222907 | * | 8/1998 |
| JP | 10-340514 | * | 12/1998 |
| JP | 2000-228044 | * | 8/2000 |

* cited by examiner

*Primary Examiner*—David Ometz
(74) *Attorney, Agent, or Firm*—Reed Smith LLP; Stanley P. Fisher, Esq.; Juan Carlos A. Marquez, Esq.

(57) ABSTRACT

The disk carrier device comprises a carrier roller having a tapered surface with the diameter thereof becoming smaller gradually from the opposite ends towards the center, and a disk guide member integrally formed with a pair of tilted protrusions in the front and rear parts thereof which become gradually lower from the opposite ends towards the center. It is constructed such that the carrier roller is arranged between the pair of tilted protrusions to resiliently clamp the disk between the both tilted protrusions and the carrier roller to thereby carry the disk by the rotation of the carrier roller.

32 Claims, 10 Drawing Sheets

FIG.3 (PRIOT ART)

FIG.4 (PRIOT ART)

DISK CARRIER DEVICE OF DISK PLAYER

BACKGROUND OF THE INVENTION

1. Field of the Invention

The present invention relates to an improvement in a disk carrier device of a disk player which carries a disk using a carrier roller.

2. Description of the Related Art

Figure 1:
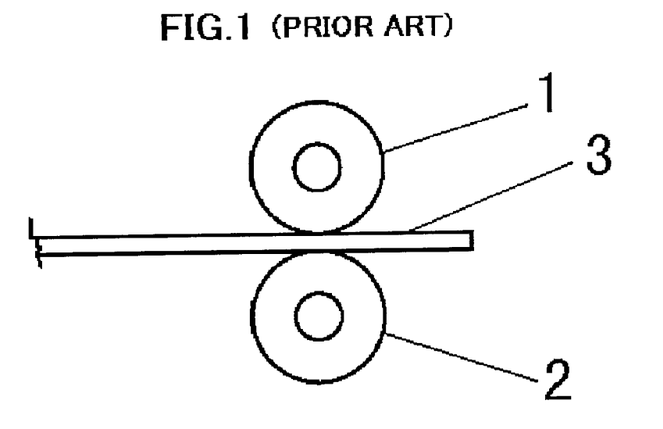
FIG. 1 is a side view of a disk carrier device showing a conventional example.
Figure 2:
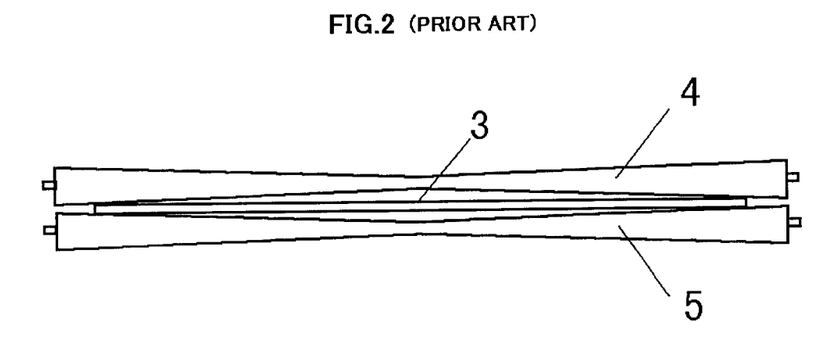
FIG. 2 is an elevational view of a disk carrier device showing another conventional example.

As the disk carrier device of the disk player, there is one type, as shown in FIG. 1, in which a disk 3 is clamped between a guide roller 1 and a carrier roller 2, and is carried by the rotation of the carrier roller 2. However, if the disk 3 is clamped between the rollers 1 and 2, there is the possibility that the recording plane of the disk 3 may be soiled or damaged due to a contact with the roller. Therefore, as shown in FIG. 2, it is proposed to protect the recording plane of the disk 3 in such a manner that a guide roller 4 and a carrier roller 5 are made to have a tapered surface with the diameter of these rollers becoming smaller from the opposite ends towards the center, and the peripheral edge of the disk 3 is clamped by the tapered surfaces of these rollers 4 and 5 (Japanese Patent Publication No. Hei 4-71267).

In this case, for example, the carrier roller 5 is energized towards the guide roller 4 by an energizing member to resiliently clamp the disk 3. However, since the disk 3 has a circular shape, the contact position in the rollers 4 and 5 with the disk 3 changes with the transport of the disk 3, and the space between the both rollers 4 and 5 also changes. That is, when the both rollers 4 and 5 clamp the edge of the disk 3, as shown by a solid line in FIG. 3, the small diameter portions of the rollers 4 and 5 come in contact with the disk 3, and hence the space between the rollers 4 and 5 becomes narrow. When the rollers 4 and 5 clamp the central portion of the disk 3, as shown by a virtual line in FIG. 3, the large diameter portions of the rollers 4 and 5 come in contact with the disk 3, and hence the space between the rollers 4 and 5 becomes wide.

Figure 3:
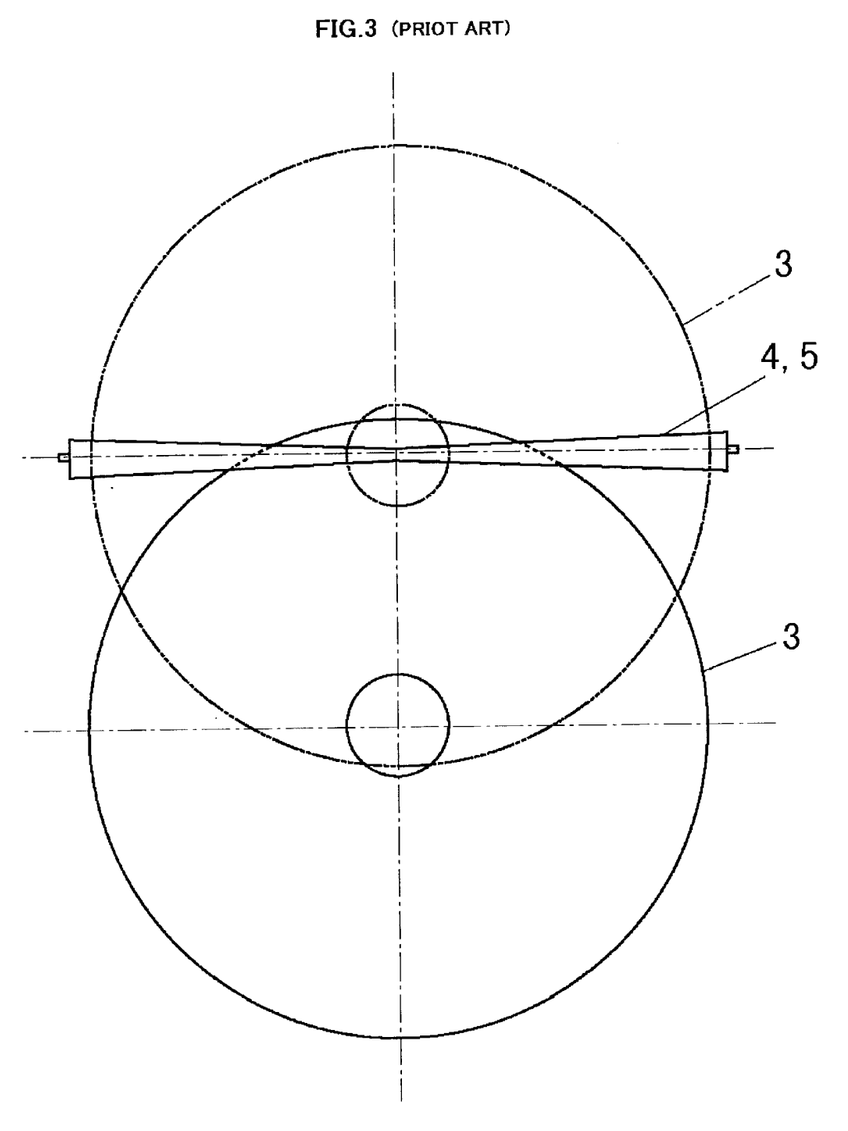
FIG. 3 is a plan view in the conventional example shown in FIG. 2.

Also, when clamping a small diameter disk, the space between the rollers 4 and 5 becomes narrow, and when clamping a large diameter disk, the space between the rollers 4 and 5 becomes wide.

As described above, when a roller having a tapered surface is used, the space between the rollers 4 and 5 changes. Therefore, attention should be paid so that the large diameter portions at the opposite ends of the both rollers do not come in contact with each other, even when the rollers 4 and 5 come closest to each other. Hence, the tapered angle cannot be set large. However, since a resilient body is used at the peripheral portions of the both rollers 4 and 5, if the tapered angle is small, the peripheral faces of the rollers 4 and 5 come in contact with the recording plane of the disk 3. Therefore, there is a problem in that the effect of making the peripheral face of the roller a tapered surface cannot be obtained, and hence the recording plane cannot be prevented from being soiled or damaged.

Figure 4:
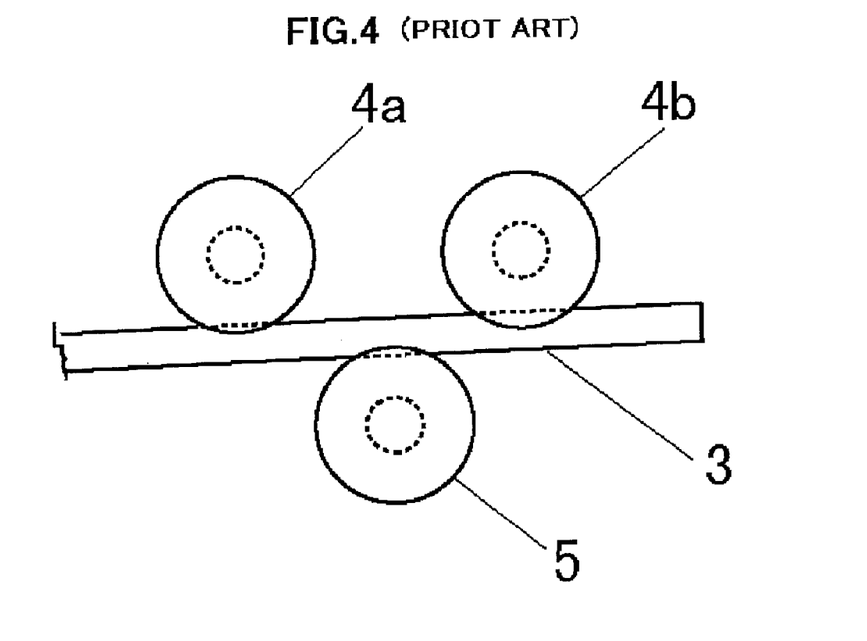
FIG. 4 is a side view of a disk carrier device showing the other conventional example.

As a solution for such problems, it can be considered that, as shown in FIG. 4, for example two guide rollers 4a and 4b having a tapered surface are arranged in parallel, and a carrier roller 5 is arranged therebetween. In this manner, even if the tapered angles of the rollers 4a, 4b and 5 are made large, there is no possibility that the large diameter portions of the guide rollers 4a, 4b and the carrier roller 5 come in contact with each other. Hence, the tapered angle of the rollers 4a, 4b and 5 can be set large, so that the peripheral faces of the rollers do not come in contact with the recording plane of the disk 3.

However, if two guide rollers are used as described above, the mechanism becomes complicated, and bearings for supporting each guide roller for rotation are also required, and hence the construction becomes further complicated. Also with an increase in the number of parts, the number of assembly processes also increases, thereby causing a problem of a cost increase.

Moreover, if the tapered angle of each guide roller is increased so as to avoid a contact with the disk, the space between the both guide rollers must be increased, thereby causing a problem in that unstable transport period until the disk 3 inserted from the guide roller 4a side reaches the guide roller 4b is extended.

SUMMARY OF THE INVENTION

In view of the above situation, it is an object of the present invention to reduce the number of parts to make it possible to manufacture a disk carrier device of a disk player carrier with a simple structure and at a low cost, in which a carrier roller has a tapered surface with the diameter thereof becoming smaller gradually from the opposite ends towards the center, there is provided a disk guide member integrally formed with a pair of tilted protrusions in the front and rear parts thereof which become gradually lower from the opposite ends towards the center, and the carrier roller is arranged between the pair of tilted protrusions to resiliently clamp the disk between the both tilted protrusions and the carrier roller to thereby carry the disk by the rotation of the carrier roller.

The disk carrier device of the disk player according to the present invention comprises a carrier roller having a tapered surface with the diameter thereof becoming smaller gradually from the opposite ends towards the center, and a disk guide member integrally formed with a pair of tilted protrusions in the front and rear parts thereof which become gradually lower from the opposite ends towards the center, wherein the carrier roller is arranged between the pair of tilted protrusions to resiliently clamp the disk between the both tilted protrusions and the carrier roller to thereby carry the disk by the rotation of the carrier roller.

With such a construction, since the pair of tilted protrusions integrally formed in the disk guide member serves as a guide roller, respectively, the disk guide member does not require a space for the diameter of a guide roller, compared to the case where the guide roller is used, and hence the space between the pair of tilted protrusions can be made short, and unstable transport state of the disk can be immediately dissolved.

Also, since the pair of tilted protrusions is integrally formed in the disk guide member, the number of parts can be reduced, to make the construction simple, and the disk can be carried stably, while protecting the recording plane of the disk.

If a recess for avoiding abutment with the large diameter portion of the carrier roller is provided between the pair of tilted protrusions of the disk guide member, the carrier roller can be easily arranged in close relationship with the pair of tilted protrusions.

If an opening is provided between the pair of tilted protrusions of the disk guide member, and this opening is used as the recess, the recess can be easily formed.

Alternatively, the space between the pair of tilted protrusions of the disk guide member is depressed, and this depression may be used as the recess. In this manner, the recess can be formed without decreasing the strength of the disk guide member.

If the disk guide member is formed by a metal plate, the disk guide member can be easily formed by press working. Also, the disk guide member can be made thin without decreasing the strength of the disk guide member. Moreover, by forming the pair of tilted protrusions by a synthetic resin and subjecting the disk guide member to an outsert molding, slidability between the disk and the pair of tilted protrusions can be improved.

DESCRIPTION OF THE PREFERRED EMBODIMENTS

Figure 5:
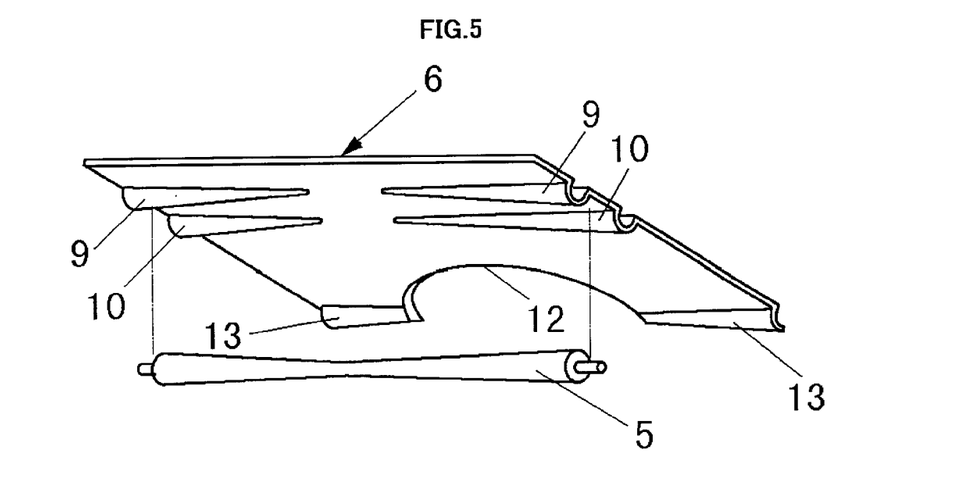
FIG. 5 is an exploded perspective view showing the relation between the disk guide member and the carrier roller in one embodiment of the present invention.

Preferred embodiments of the present invention will now be described with reference to the drawings. FIG. 5 is a perspective view of a disk guide member 6. This disk guide member 6 is integrally formed by subjecting a metal plate to a press working, and arranged above the carrier roller 5. The carrier roller 5 has a tapered surface with the diameter thereof becoming smaller gradually from the opposite ends towards the center, and is energized towards the disk guide member 6 by an energizing member (not shown).

Figure 6:
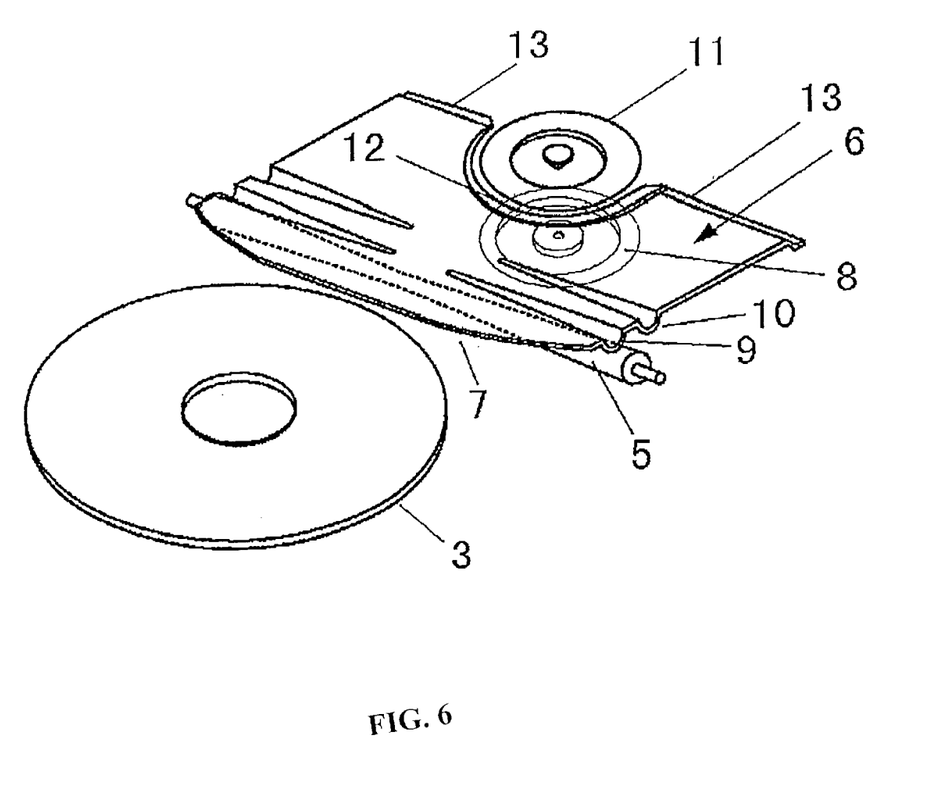
FIG. 6 is a perspective view of a disk carrier device in this embodiment.

As shown in FIG. 6, the disk guide member 6 has first and second tilted protrusions 9, 10 on the undersurface side from the disk insertion slot towards the turntable 8. These tilted protrusions 9 and 10 have a height gradually decreasing from the opposite ends towards the center. Each of the tilted protrusions 9 and 10 has a center flat portion which divides the respective tilted protrusion into two lateral portions.

A clamper 11 is arranged above the turntable 8, and the disk 3 is clamped at the playback position between the turntable 8 and the clamper 11. The innermost part of the disk guide member 6 extends to the slightly further side from the center of the turntable 8 and the clamper 11, between the turntable 8 and the clamper 11, and a notch portion 12 in a semi-circular shape is provided for passing the clamper 11 therethrough, at the center of the innermost part thereof.

Also on the right and left sides of the notch portion 12, there is provided a third tilted protrusion 13 protruding downwards to the undersurface side. This tilted protrusion 13 also has a height gradually decreasing from the opposite ends towards the center.

In the above-described construction, when the disk 3 is inserted between the carrier roller 5 and the disk guide member 6 through the disk insertion slot 7, the disk 3 is clamped between the tapered surface of the carrier roller 5 and the tilted faces of the first and second tilted protrusions 9 and 10 of the disk guide member 6, and carried to the space between the turntable 8 and the clamper 11 by the rotation of the carrier roller 5.

The carrier roller 5 is arranged between the first and second tilted protrusions 9 and 10 of the disk guide member 6, and these tilted protrusions 9 and 10 respectively serve as the guide rollers 4a and 4b in FIG. 4. Hence, there is no possibility that the tapered surface of the carrier roller 5 comes in contact with the tilted protrusions 9 and 10, even if the tapered angle of the tapered surface of the carrier roller 5 and the tilted angle of the tilted protrusions 9 and 10 are set large. By setting the tapered angle and the tilted angle large, the carrier roller 5 and the tilted protrusions 9 and 10 are prevented from contacting with the recording plane of the disk 3. Moreover, since the disk guide member 6 is an integrally formed single part, the number of parts can be reduced to make the construction simple, and the number of assembly processes can be also decreased. Furthermore, the disk can be carried while protecting the recording plane of the disk 3.

Figure 7:
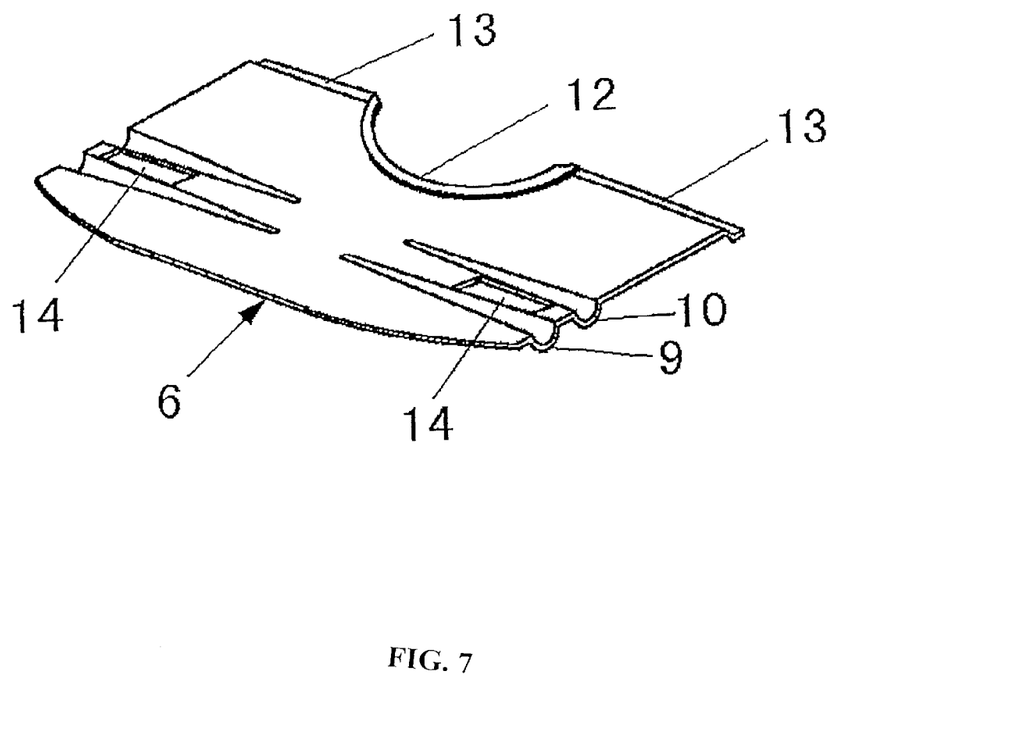
FIG. 7 is a perspective view showing a modified example of the disk guide member.

FIG. 7 shows a modified example of the present invention, wherein an opening 14 is formed as a recess for avoiding abutment with the large diameter portion of the carrier roller 5 is provided between the first and second tilted protrusions 9, 10 of the disk guide member 6. By having such a construction, the carrier roller 5 can be sufficiently brought in close relationship with the disk guide member 6, and the tapered angle of the carrier roller 5 can be also set large.

Figure 8:
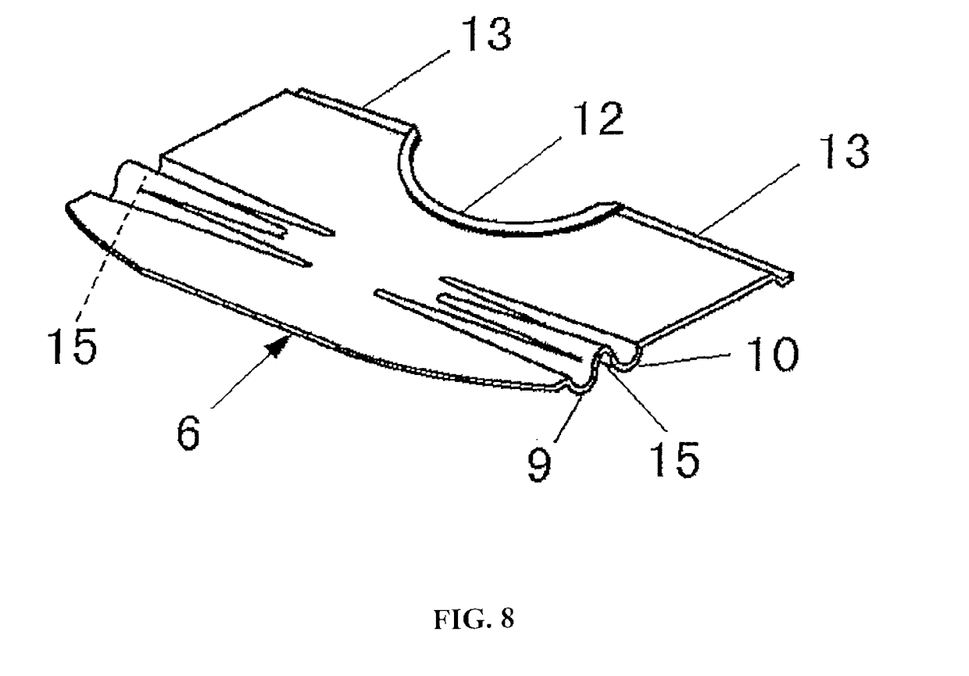
FIG. 8 is a perspective view showing another modified example of the disk guide member.

FIG. 8 shows another modified example of the disk guide member 6, wherein a depression 15 swelled upwards between the pair of tilted protrusions 9 and 10 is provided as a recess of the carrier roller 5. As a result, the recess can be formed without decreasing the strength of the disk guide member 6.

It has been described above that the disk guide member 6 is formed by subjecting a metal plate to the press working. However, if there is no problem in view of the strength, the disk guide member 6 may be formed of a synthetic resin or the like.

The disk guide member 6 may be subjected to the outsert molding, by using a synthetic resin for the pair of tilted protrusions 9 and 10.

A second embodiment of the present invention will now be described with reference to FIG. 9 and FIG. 10.

Figure 9:
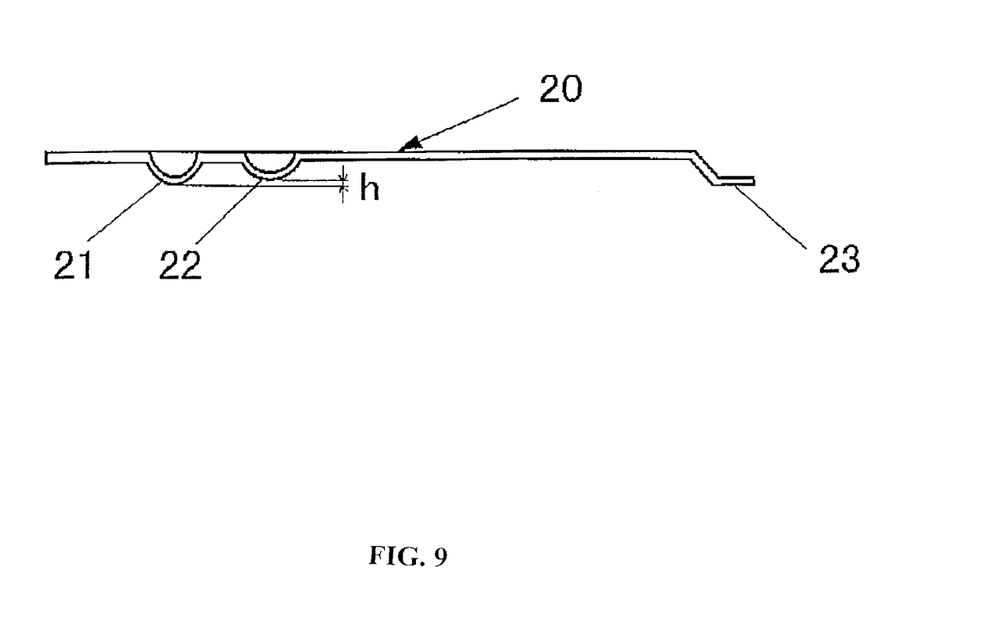
FIG. 9 is a side view of a disk guide member in a second embodiment.

FIG. 9 is a side view of a disk guide member 20. A different point from the disk guide member 6 in the first embodiment is that a second tilted protrusion 22 on the inner side is set to be slightly lower than a first tilted protrusion 21 on this side (dimension h: for example about 5/100 mm), and the protrusion 22 on the inner side is located at a higher position than the protrusion on this side. The difference in the height (dimension h) between the protrusion 22 on the inner side and the protrusion 21 on this side is set in the manner described below.

Figure 10:
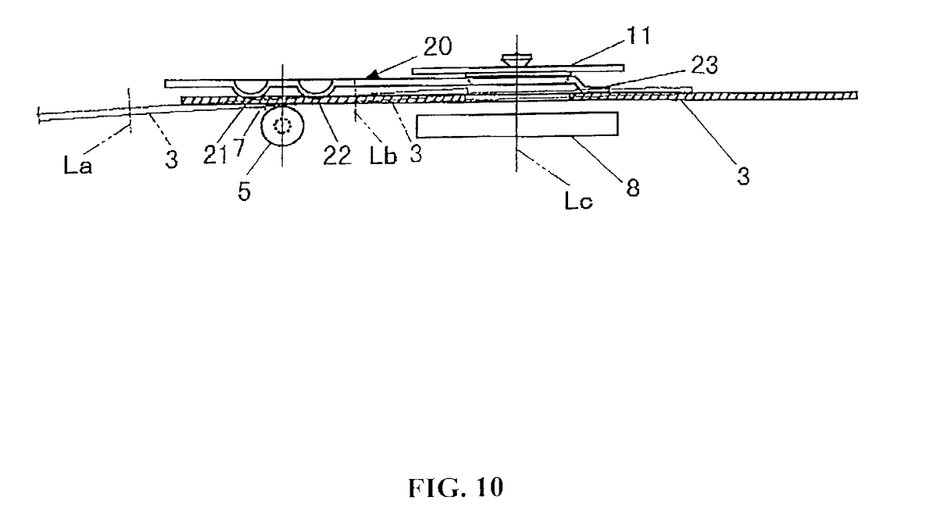
FIG. 10 is a side view of a disk carrier device in the second embodiment.

That is to say, as shown in FIG. 10, the height is set so that in the process in which the disk inserted from the insertion slot 7 is carried to the space between the turntable 8 and the clamper 11, the innermost edge of the disk reaches onto the turntable 8 in the horizontal state or in the state slightly inclined upwards, at least without being inclined downwards.

By having such a construction, there is no possibility that the disk is inclined downwards to touch the turntable 8 in the process of carrying the disk. Hence, the turntable 8 can be arranged in close relationship with the transport level of the disk 3. As a result, the turntable 8 and the clamper 11 can be arranged close to each other, thereby enabling a reduction in the height dimension of the whole reproducer.

Figure 11:
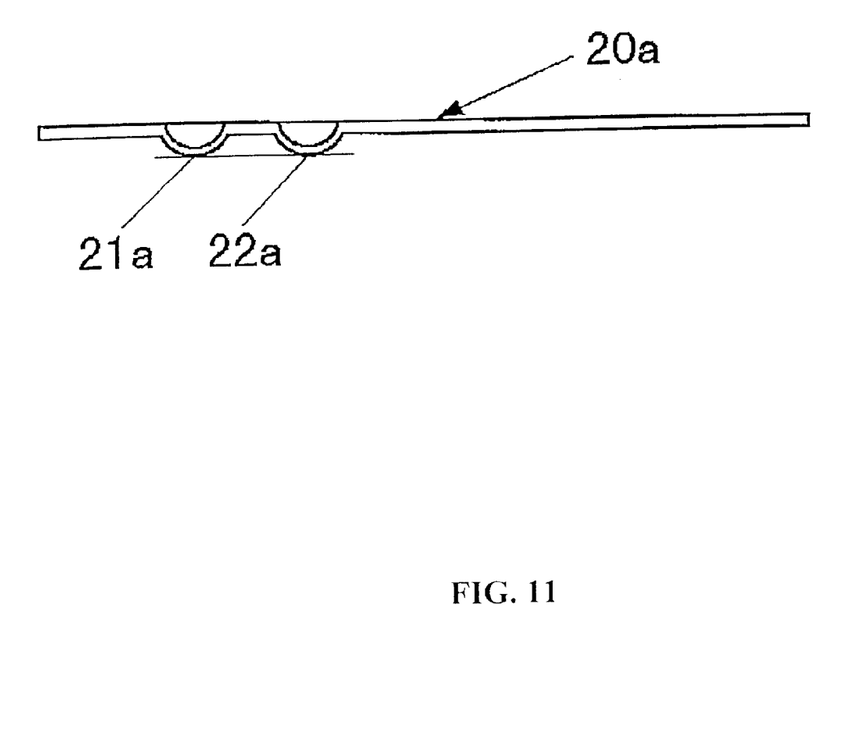
FIG. 11 is an explanatory diagram of a disk guide member used for the comparison with FIG. 9.
Figure 12:
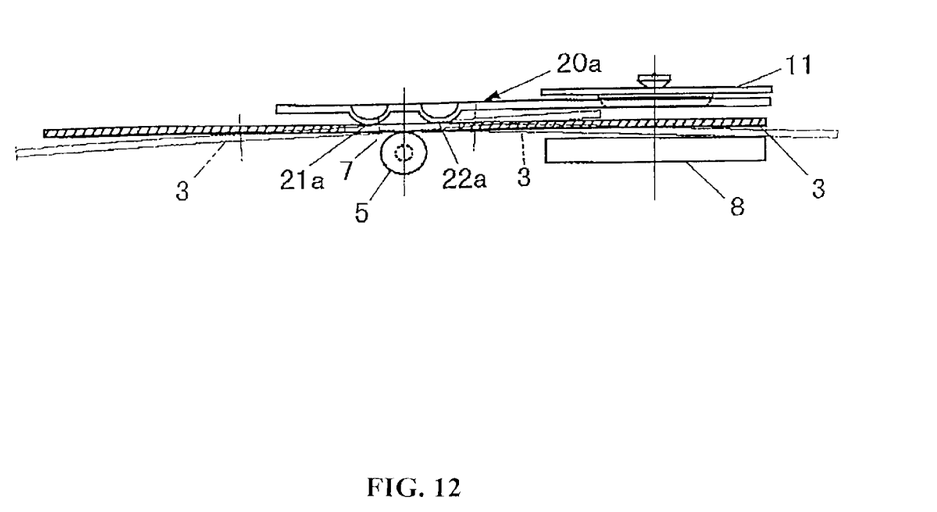
FIG. 12 is an explanatory diagram of a disk guide member used for the comparison with FIG. 10.

If it is assumed that the first and second tilted protrusions 21a and 22a of the disk guide member 20a are set to be the same height as shown in FIG. 11, the disk 3 becomes horizontal, as shown by a solid line in FIG. 12, when the center line of the disk 3 is located in the center of the carrier roller 5. When the center of the disk is located on the insertion slot 7 side than the center of the carrier roller 5, the disk 3 is carried in the state inclined upwards, and on the contrary, when the center of the disk 3 passes the center of the carrier roller 5, the disk 3 is carried in the state inclined downwards. In this case, after the center of the disk 3 has passed the center of the carrier roller 5, the disk 3 is inclined downwards, and the recording plane thereof may be brought in contact with the disk-loading plane of the turntable 8. Hence, the turntable 8 must be arranged sufficiently lower than the transport level of the disk 3. As a result, the height dimension of the whole reproducer must be increased. However, by constructing as shown in the second embodiment, such a problem can be avoided.

Disk transport in the second embodiment is performed as described below.

Until the center of the disk 3 inserted from the insertion slot 7 reaches the center of the carrier roller 5, as shown by a symbol La in FIG. 10, the disk 3 comes in contact with the second tilted protrusion 22 at a higher position than that of the first tilted protrusion 21. Hence, the disk is carried inclined upwards, as shown by a virtual line.

When the center of the disk is carried in this state, passes through the center of the carrier roller 5 and reaches a position shown by a symbol Lb, since the second tilted protrusion 22 is located at a higher position than that of the first tilted protrusion 21, the disk is carried in the state with the edge being inclined upwards. At this time, even if it is tried to incline the disk further upwards, since the peripheral edge on the upper face of the disk touches the lower face of the disk guide member 20, the upward inclination of the disk can be restricted.

When the disk is carried further, the peripheral edge on the upper face of the disk abuts against the slope of the third tilted protrusion 23 of the disk guide member 20. Thereafter, the disk 3 is carried along this third tilted protrusion 23, and reaches the space between the turntable 8 and the clamper 11, as shown by a solid line, while substantially keeping the horizontal state. Thereafter, the clamper 11 comes down by a normal clamper lifting mechanism (not shown) to load the disk 3 on the turntable 8.

The disk inserted from the insertion slot 7 does not incline until it is clamped between the clamper 11 and the turntable 8, and hence the turntable 8 and the clamper 11 can be arranged close to each other, thereby enabling a reduction in the height dimension of the whole reproducer.

In the second embodiment, the protrusion 22 is located at a position higher than that of the protrusion 21, by forming the second tilted protrusion 22 lower than the first tilted protrusion 21. However, as shown in FIG. 11, even in the case where the both protrusions 21a and 22a are formed in the same height, the protrusion 22a can be located at a higher position than the protrusion 21a, by slightly inclining the whole disk guide member 20a, and the similar effect can be obtained.

As described above, the disk carrier device of the disk player of the present invention is formed such that a disk is resiliently clamped between the carrier roller having a tapered surface with the diameter thereof becoming smaller gradually from the opposite ends towards the center and the pair of tilted protrusions integrally formed in the disk guide member to thereby carry the disk by the rotation of the carrier roller. Therefore, the allocation space can be decreased compared to the case where a pair of guide rollers is used, and the number of parts can be reduced, thereby the apparatus can be made small. Further, the space between the pair of tilted protrusions can be made narrow, to shorten the unstable transport period at the initial stage of the disk transport, and the number of assembly processes can be also decreased, thereby enabling cost reduction.

Moreover, by providing the recess for avoiding abutment with the large diameter portion of the carrier roller between the pair of tilted protrusions of the disk guide member, the carrier roller can be easily arranged in close relationship with the pair of tilted protrusions.

The recess can be easily formed by providing an opening or a depression between the pair of tilted protrusions. Particularly when the depression is formed, the recess can be formed without decreasing the strength of the disk guide member.

If the disk guide member is formed by a metal plate, the disk guide member can be easily formed by press working. Also, the disk guide member can be made thin without decreasing the strength of the disk guide member. Moreover, by forming the pair of tilted protrusions by a synthetic resin and subjecting the disk guide member to the outsert molding, the slidability between the disk and the pair of tilted protrusions can be improved.

Furthermore, by locating the protrusion on the inner side, of the pair of tilted protrusions of the disk guide member, at a higher position than the tilted protrusion on this side, a problem in that the disk inclines downwards to touch the turntable can be avoided. Therefore, the turntable can be arranged close to the transport level of the disk, and as a result, the turntable and a clamper can be arranged close to each other, to thereby decrease the height dimension of the whole reproducer.

What is claimed is:

1. A disk carrier device of a disk player for carrying a disk, comprising:

a carrier roller having a tapered surface with the diameter thereof becoming smaller gradually from the opposite ends towards the center; and a disk guide member with an under surface having a first tilted protrusion, a second tilted protrusion and a third tilted protrusion protruding away from the disk guide member towards the disk and being disposed in parallel with a disk insertion slot, each of the first tilted protrusion, the second tilted protrusion and the third tilted protrusion protruding further gradually from the center towards the opposite ends thereof, wherein the carrier roller is arranged between the first tilted protrusion and the second tilted protrusion, the third tilted protrusion is on an innermost part of the disk guide member which extends over the center of a turntable, the first tilted protrusion protrudes away from the disk guide member further than the second tilted protrusion such that when the disk is resiliently clamped between the first and the second tilted protrusions and the carrier roller, the disk is inclined to be spaced away from the turntable while the inclination of the innermost edge of the disk is adjusted downwards by the third tilted protrusion.

2. A disk carrier device of a disk player according to claim 1, wherein each of the first and second tilted protrusions has a center flat portion which divides the respective tilted protrusion into two lateral portions.

3. A disk carrier device of a disk player according to claim 2, wherein a recess for avoiding abutment with the large diameter portion of the carrier roller is provided between the first and second tilted protrusions of the disk guide member.

4. A disk carrier device of a disk player according to claim 3, wherein the recess is formed by an opening provided between the first and second tilted protrusions of the disk guide member.

5. A disk carrier device of a disk player according to claim 4, wherein the disk guide member is integrally formed of a metal plate.

6. A disk carrier device of a disk player according to claim 5, wherein the disk guide member is obtained by outsert molding, by using a synthetic resin for the first, second and third tilted protrusions.

7. A disk carrier device of a disk player according to claim 4, wherein the disk guide member is obtained by outsert molding, by using a synthetic resin for the first, second and third tilted protrusions.

8. A disk carrier device of a disk player according to claim 3, wherein the recess is formed by a depression provided between the first and second tilted protrusions of the disk guide member.

9. A disk carrier device of a disk player according to claim 8, wherein the disk guide member is integrally formed of a metal plate.

10. A disk carrier device of a disk player according to claim 9, wherein the disk guide member is obtained by outsert molding, by using a synthetic resin for the first, second and third tilted protrusions.

11. A disk carrier device of a disk player according to claim 8, wherein the disk guide member is obtained by outsert molding, by using a synthetic resin for the first, second and third tilted protrusions.

12. A disk carrier device of a disk player according to claim 3, wherein the disk guide member is integrally formed of a metal plate.

13. A disk earner device of a disk player according to claim 12, wherein the disk guide member is obtained by outsert molding, by using a synthetic resin for the first, second and third tilted protrusions.

14. A disk carrier device of a disk player according to claim 3, wherein the disk guide member is obtained by outsert molding, by using a synthetic resin for the first, second and third tilted protrusions.

15. A disk carrier device of a disk player according to claim 2, wherein the disk guide member is integrally formed of a metal plate.

16. A disk carrier device of a disk player according to claim 15, wherein the disk guide member is obtained by outsert molding, by using a synthetic resin for the first, second and third tilted protrusions.

17. A disk carrier device of a disk player according to claim 2, wherein the disk guide member is obtained by outsert molding, by using a synthetic resin for the first, second and third tilted protrusions.

18. A disk carrier device of a disk player according to claim 1, wherein a recess for avoiding abutment with the large diameter portion of the carrier roller is provided between the first and second tilted protrusions of the disk guide member.

19. A disk carrier device of a disk player according to claim 18, wherein the recess is formed by an opening provided between the first and second tilted protrusions of the disk guide member.

20. A disk carrier device of a disk player according to claim 19, wherein the disk guide member is integrally formed of a metal plate.

21. A disk carrier device of a disk player according to claim 20, wherein the disk guide member is obtained by outsert molding, by using a synthetic resin for the first, second and third tilted protrusions.

22. A disk carrier device of a disk player according to claim 23, wherein the disk guide member is obtained by outsert molding, by using a synthetic resin for the first, second and third tilted protrusions.

23. A disk carrier device of a disk player according to claim 18, wherein the recess is formed by a depression provided between the first and second tilted protrusions of the disk guide member.

24. A disk carrier device of a disk player according to claim 23, wherein the disk guide member is integrally formed of a metal plate.

25. A disk carrier device of a disk player according to claim 24, wherein the disk guide member is obtained by outsert molding, by using a synthetic resin for the first, second and third tilted protrusions.

26. A disk carrier device of a disk player according to claim 23, wherein the disk guide member is obtained by outsert molding, by using a synthetic resin for the first, second and third tilted protrusions.

27. A disk carrier device of a disk player according to claim 18, wherein the disk guide member is integrally formed of a metal plate.

28. A disk carrier device of a disk player according to claim 27, wherein the disk guide member is obtained by outsert molding, by using a synthetic resin for the first, second and third tilted protrusions.

29. A disk carrier device of a disk player according to claim 18, wherein the disk guide member is obtained by outsert molding, by using a synthetic resin for the first, second and third tilted protrusions.

30. A disk carrier device of a disk player according to claim 1, wherein the disk guide member is integrally formed of a metal plate.

31. A disk carrier device of a disk player according to claim 30, wherein the disk guide member is obtained by outsert molding, by using a synthetic resin for the first, second and third tilted protrusions.

32. A disk carrier device of a disk player according to claim 1, wherein the disk guide member is obtained by outsert molding, by using a synthetic resin for the first and second tilted protrusions.

* * * * *